United States Patent [19]
Willi et al.

[11] Patent Number: 6,032,617
[45] Date of Patent: Mar. 7, 2000

[54] DUAL FUEL ENGINE WHICH IGNITES A HOMOGENEOUS MIXTURE OF GASEOUS FUEL, AIR, AND PILOT FUEL

[75] Inventors: Martin L. Willi; Min Wu, both of Lafayette, Ind.

[73] Assignee: Caterpillar Inc., Peoria, Ill.

[21] Appl. No.: 09/085,641

[22] Filed: May 27, 1998

[51] Int. Cl.$^7$ .............................. F02B 7/06; F02M 49/02; F02M 21/02

[52] U.S. Cl. ................... 123/27 GE; 123/300; 123/304; 123/431; 123/435; 123/526

[58] Field of Search .................................... 123/299, 300, 123/304, 27 GE, 435, 525, 526, 431, 25 C

[56] References Cited

U.S. PATENT DOCUMENTS

| | | | |
|---|---|---|---|
| 673,160 | 4/1901 | Diesel | 123/27 GE |
| 2,400,247 | 5/1946 | Miller et al. | 123/304 |
| 2,612,880 | 10/1952 | Schowalter | 123/525 |
| 4,351,298 | 9/1982 | Franke | 123/431 |
| 4,414,940 | 11/1983 | Loyd | 123/299 |
| 4,416,229 | 11/1983 | Wood | 123/304 |
| 4,520,766 | 6/1985 | Akeroyd | 123/525 |
| 4,524,730 | 6/1985 | Doell et al. | 123/27 GE |
| 4,527,516 | 7/1985 | Foster | 123/27 GE |
| 4,603,674 | 8/1986 | Tanaka | 123/575 |
| 4,708,094 | 11/1987 | Helmich et al. | 123/27 GE |
| 4,754,733 | 7/1988 | Steiger | 123/299 |
| 4,831,993 | 5/1989 | Kelgard | 123/525 |
| 4,856,484 | 8/1989 | Wilson et al. | 123/525 |
| 5,050,550 | 9/1991 | Gao | 123/304 |
| 5,060,610 | 10/1991 | Paro | 123/300 |
| 5,069,183 | 12/1991 | Nagano et al. | 123/435 |

(List continued on next page.)

OTHER PUBLICATIONS

Edward F. Obert, Internal Combustion Engines and Air Pollution, 1973, pp. 612–615.

V.M. Zamansky and A.A. Borisov, Promotion of High–Temperature Self–Ignition, 1992, pp. 297–324.

David E. Foster and Paul M. Najt, Compression–Ignited Homogeneous Charge Combustion, 1983, pp. 1–16.

J. Ray Smith, Salvador M. Aceves, Charles Westbrook and William Pitz, Modeling of Homogeneous Charge Compression Ignition (HCCI) of Methane, 1997, pp. 85–90.

Thomas W. Ryan, III and Timothy J. Callahan, Homogeneous Charge Compression Ignition of Diesel Fuel, 1996, pp. 157–166.

Yoshinaka Takeda, Nakagome Keiichi and Niimura Keiichi, Emission Characteristics of Premixed Lean Diesel Combustion with Extremely Early Stated Fuel Injection, 1996, pp. 19–28.

L.J. Spadaccini and M.B. Colket, III, Ignition Delay Characteristics of Methane Fuels, 1994, pp. 431–459.

R.H. Thring, Homogeneous–Charge Compression–Ignition (HCCI) Engines, 1996, pp. 1–9.

(List continued on next page.)

*Primary Examiner*—Tony M. Argenbright
*Assistant Examiner*—Brian J. Hairston
*Attorney, Agent, or Firm*—Maginot, Addison & Moore

[57] ABSTRACT

A method of operating an engine assembly having a cylinder assembly which defines a combustion chamber is disclosed. The method includes the steps of performing an intake stroke of the cylinder assembly and advancing a conditioning fuel into the combustion chamber during the intake stroke performing step. The method further includes the steps of advancing a gaseous fuel into the combustion chamber during the intake stroke performing step and performing a compression stroke of the cylinder assembly after the intake stroke performing step. The method yet further includes the steps of advancing a pilot fuel into the combustion chamber during the compression stroke performing step and combusting the pilot fuel in the combustion chamber during the compression stroke performing step so as to ignite the conditioning fuel and the gaseous fuel. The gaseous fuel and the conditioning fuel are mixed in the combustion chamber prior to the pilot fuel advancing step so as to facilitate ignition of the gaseous fuel in the combustion chamber.

20 Claims, 4 Drawing Sheets

U.S. PATENT DOCUMENTS

| | | | |
|---|---|---|---|
| 5,119,780 | 6/1992 | Ariga | 123/300 |
| 5,127,378 | 7/1992 | Ito | 123/300 |
| 5,139,002 | 8/1992 | Lynch et al. | 123/575 |
| 5,224,457 | 7/1993 | Arsenault et al. | 123/27 GE |
| 5,243,932 | 9/1993 | Herrmann | 123/304 |
| 5,291,865 | 3/1994 | Sasaki | 123/431 |
| 5,315,973 | 5/1994 | Hill et al. | 123/304 |
| 5,515,829 | 5/1996 | Wear et al. | 123/446 |
| 5,535,708 | 7/1996 | Valentine | 123/25 C |
| 5,682,856 | 11/1997 | Tomisawa et al. | 123/435 |
| 5,870,978 | 2/1999 | Willi et al. | 123/27 GE |

OTHER PUBLICATIONS

Keiichi Nakagome, Naoki Shimazaki and Keiichi Niimura, Combustion and Emission Characteristics of Premixed Lean Diesel Combustion Engine, 1997, pp. 163–171.

DUAL FUEL ENGINE WHICH IGNITES A HOMOGENEOUS MIXTURE OF GASEOUS FUEL, AIR, AND PILOT FUEL

TECHNICAL FIELD OF THE INVENTION

The present invention relates generally to a dual fuel engine, and more specifically to a dual fuel engine which ignites a homogeneous mixture of gaseous fuel, air, and pilot fuel.

BACKGROUND OF THE INVENTION

Natural gas has several advantages over other hydrocarbon fuels that are combusted in internal combustion engines. For example, natural gas is less expensive relative to other hydrocarbon fuels. Moreover, for example, natural gas burns cleaner during operation of the internal combustion engine relative to other hydrocarbon fuels. By burning cleaner, a reduced amount of combustion byproducts such as carbon monoxide, oxides of nitrogen or hydrocarbons are released into the environment during operation of the internal combustion engine. In addition, because lubricants of the internal combustion engine become contaminated with the combustion byproducts over a time period, the production of a reduced amount of combustion byproducts results in less contamination of the lubricants over the time period thereby increasing the useful life of the lubricants.

One type of internal combustion engine is a diesel engine. Diesel engines combust fuel by compressing a mixture of air and fuel to a point where the fuel is ignited by heat which results from such compression. When natural gas is used as a fuel in a diesel engine, the natural gas does not readily ignite as it is compressed. In order to overcome this problem, an ignition source is provided to ignite the natural gas. The ignition source may be provided by a spark plug similar to those used in spark ignition engines. However, in certain types of diesel engines (e.g. dual fuel engines), the ignition source is provided by injecting a stream of diesel pilot fuel, into a mixture of air and natural gas (or other gaseous fuel). As the mixture of air, natural gas, and diesel pilot fuel is compressed, the diesel pilot fuel ignites, which in turn ignites the natural gas.

When operating an engine with a mixture of natural gas and pilot diesel fuel, the presence of the pilot diesel fuel during combustion of the mixture results in generation of a certain amount of oxides of Nitrogen ($NO_x$). This certain amount of $NO_x$ is greater than the amount of $NO_x$ produced when the engine is operated on natural gas alone. This is true since the composition (i.e. ratio of air to fuel) of the mixture varies depending on its proximity to the stream of diesel pilot fuel being injected into the combustion chamber. In particular, the mixture of natural gas and pilot diesel fuel near the stream of diesel pilot fuel is rich, while the mixture away from the stream of diesel pilot fuel is lean. Combustion of rich mixtures tend to produce a substantial quantity of $NO_x$. (Note that combustion of lean mixtures tend to produce a substantially reduced quantity of $NO_x$).

What is needed therefore is a dual fuel engine which generates a relatively small amount of $NO_x$ and other combustion byproducts during operation of the engine.

DISCLOSURE OF THE INVENTION

In accordance with a first embodiment of the present invention, there is provided a method of operating an engine assembly having a cylinder assembly which defines a combustion chamber. The method includes the steps of performing an intake stroke of the cylinder assembly and advancing a conditioning fuel into the combustion chamber during the intake stroke performing step. The method further includes the steps of advancing a gaseous fuel into the combustion chamber during the intake stroke performing step and performing a compression stroke of the cylinder assembly after the intake stroke performing step. The method yet further includes the steps of advancing a pilot fuel into the combustion chamber during the compression stroke performing step and combusting the pilot fuel in the combustion chamber during the compression stroke performing step so as to ignite the conditioning fuel and the gaseous fuel. The gaseous fuel and the conditioning fuel are mixed in the combustion chamber prior to the pilot fuel advancing step so as to facilitate ignition of the gaseous fuel in the combustion chamber.

In accordance with a second embodiment of the present invention, there is provided a method of operating an engine assembly having a cylinder assembly which defines a combustion chamber. The cylinder assembly is operable to perform an intake stroke and a compression stroke. The method includes the steps of advancing a conditioning fuel into the combustion chamber with a fuel injector during the intake stroke and advancing a gaseous fuel into the combustion chamber during the intake stroke. The method further includes the step of advancing a pilot fuel into the combustion chamber with the fuel injector during the compression stroke and combusting the pilot fuel in the combustion chamber during the compression stroke so as to ignite the conditioning fuel and the gaseous fuel.

In accordance with a third embodiment of the present invention, there is provided a method of operating an engine assembly having a cylinder assembly which defines a combustion chamber. The cylinder assembly being operable to perform an intake stroke and a compression stroke. The method includes the steps of advancing a conditioning fuel into the combustion chamber with a conditioning fuel injector during the intake stroke and advancing a gaseous fuel into the combustion chamber during the intake stroke. The method further includes the steps of advancing a pilot fuel into the combustion chamber with a pilot fuel injector during the compression stroke and combusting the pilot fuel in the combustion chamber during the compression stroke so as to ignite the conditioning fuel and the gaseous fuel.

BEST MODE FOR CARRYING OUT THE INVENTION

Figure 1:
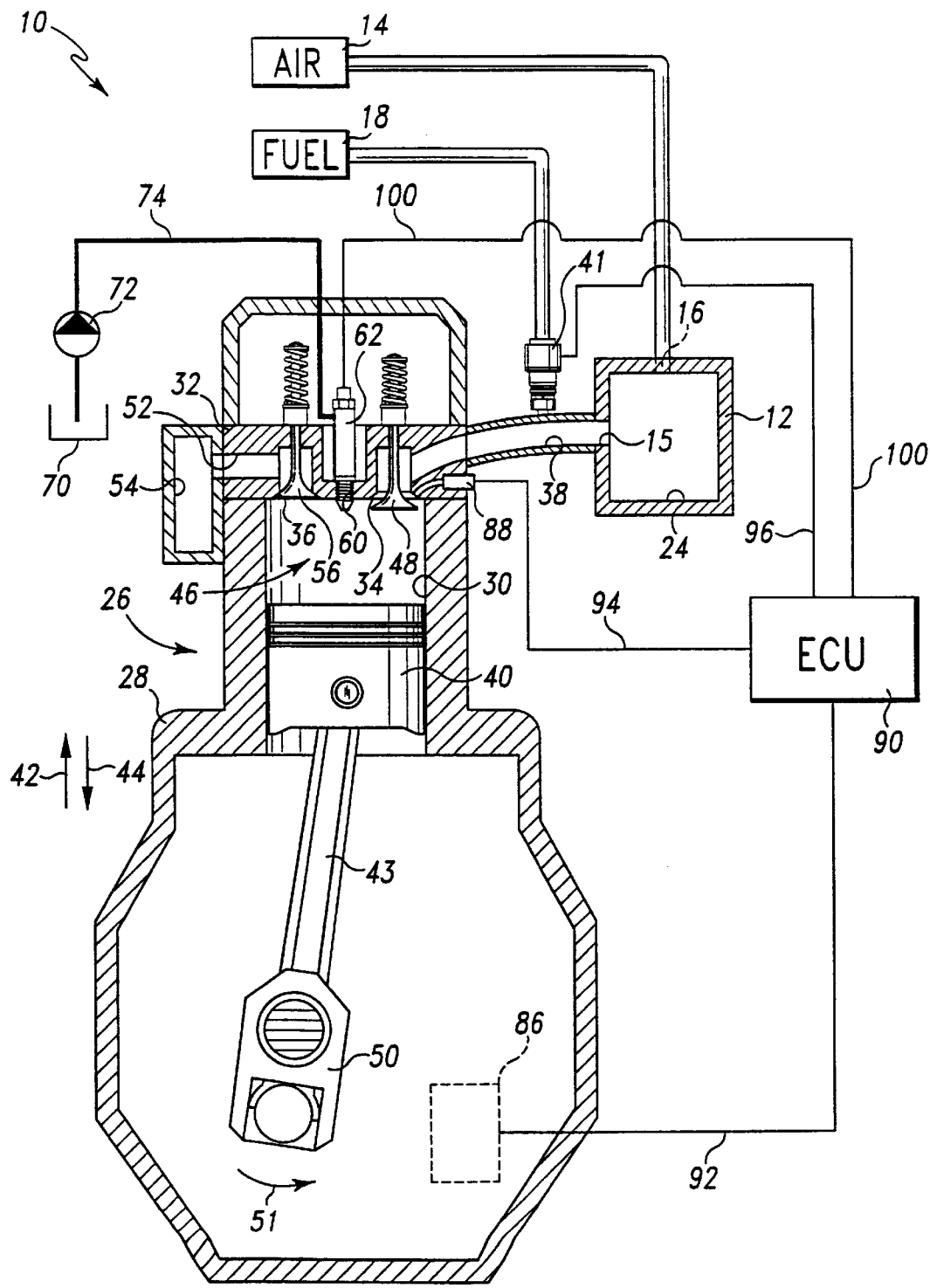
FIG. 1 is a partial cross sectional, partial schematic view of a dual fuel engine which incorporates the features of the present invention therein.

While the invention is susceptible to various modifications and alternative forms, two specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
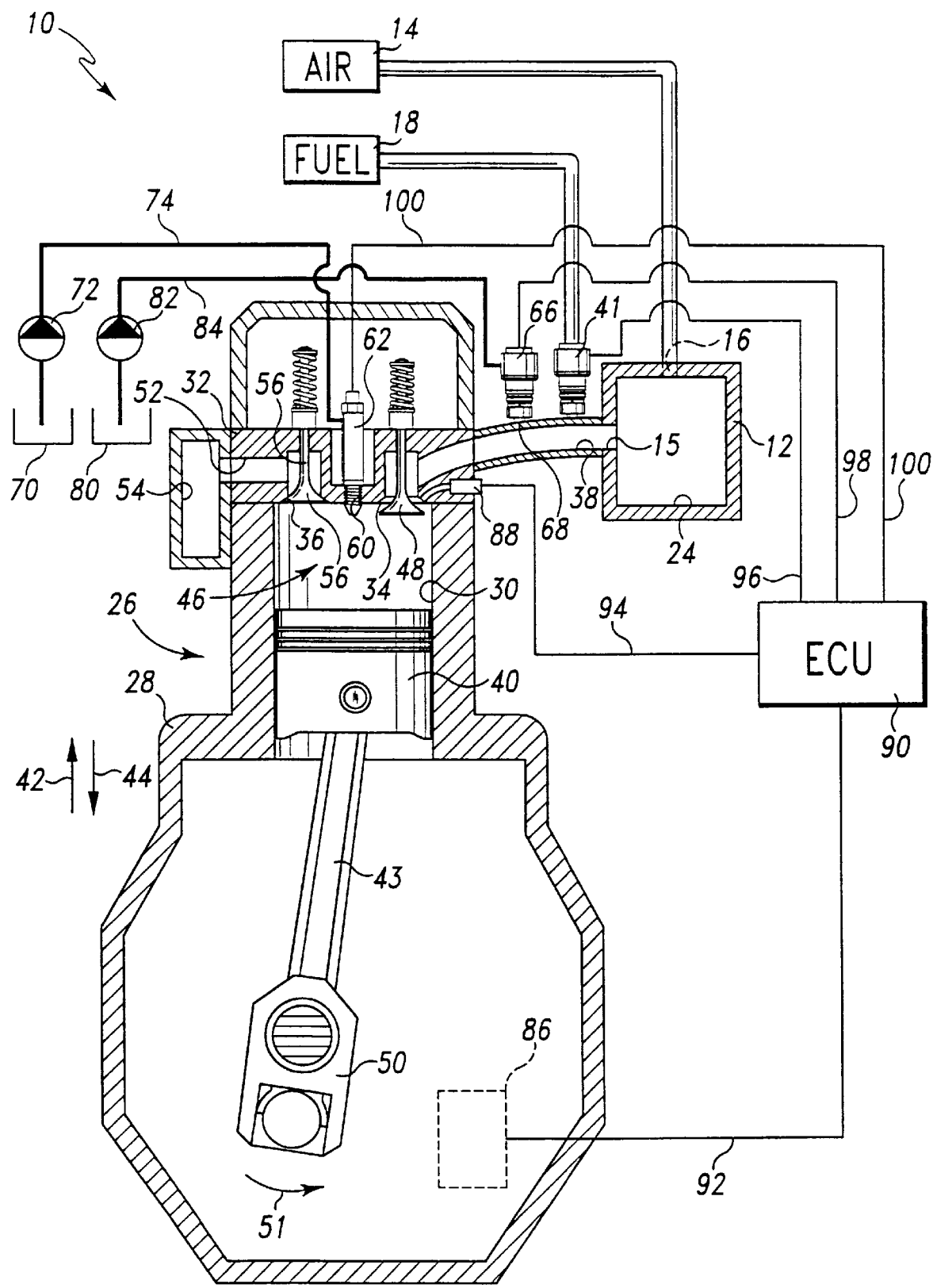
FIG. 2 is a partial cross sectional, partial schematic view of a second embodiment of the dual fuel engine which incorporates the features of the present invention therein.

Referring now to FIGS. 1 and 2, there is shown an engine assembly 10. The engine assembly 10 includes a plenum member 12, and an air source 14. The plenum member 12 has an inlet opening 16, and an exit opening 15 defined therein. The air source 14 supplies air to the inlet opening 16. The air from the air source 14 advances into a plenum chamber 24 defined in the plenum member 12 via the inlet opening 16.

The engine assembly 10 further includes a fuel combustion assembly or cylinder assembly 26. The cylinder assembly 26 includes a block 28 having a piston cylinder 30 defined therein. An engine head 32 is secured to the block 28. The engine head 32 has an intake port 34, an exhaust port 36, and a first fuel injector opening 60 defined therein. An intake conduit 38 places the intake port 34 in fluid communication with the exit opening 15 of the plenum member 12. An exhaust conduit 52 places the exhaust port 36 in fluid communication with an exhaust manifold 54.

The engine assembly 10 further includes a piston 40 which translates in the piston cylinder 30 in the general direction of arrows 42 and 44. As the piston 40 moves downwardly in the general direction of arrow 44 to the position (shown in FIG. 1), a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to the uppermost position (not shown).

The piston 40, the piston cylinder 30, and the engine head 32 cooperate so as to define a combustion chamber 46. In particular, when the piston 40 is advanced in the general direction of arrow 42, the volume of the combustion chamber 46 is decreased. On the other hand, when the piston 40 is advanced in the general direction of arrow 44, the volume of the combustion chamber 46 is increased as shown in FIG. 1.

The engine assembly 10 further includes a gaseous fuel source 18 in fluid communication with the intake conduit 38. A gaseous fuel supply valve 41 controls the amount of gaseous fuel, such as natural gas, advanced to the intake conduit 38. In particular, the gaseous fuel supply valve 41 moves between an open position which advances gaseous fuel to the intake conduit 38 and a closed position which prevents advancement of gaseous fuel to the intake conduit 38. It should be appreciated that the amount of gaseous fuel advanced by the gaseous fuel valve 41 controls the ratio of air to gaseous fuel, or air-fuel ratio, advanced to the combustion chamber 46. Specifically, if it is desired to advance a leaner mixture to the combustion chamber 46, the gaseous fuel valve 41 is operated to advance less gaseous fuel to the intake conduit 38. On the other hand, if it is desired to advance a richer mixture of air and gaseous to the combustion chamber 46, the gaseous fuel valve 41 is operated to advance more gaseous fuel to the intake conduit 38.

An intake valve 48 selectively places the plenum chamber 24 in fluid communication with the combustion chamber 46. The intake valve 48 is actuated in a known manner by a camshaft (not shown), a pushrod (not shown), and a rocker arm (not shown) driven by the rotation of the crankshaft 50. When the intake valve 48 is placed in the open position (shown in FIGS. 1 and 2) air and gaseous fuel is advanced from the intake conduit 38 to the combustion chamber 46 via the intake port 34. When the intake valve 48 is placed in the closed position (not shown) gaseous fuel and air are prevented from advancing from the intake conduit 38 to the combustion chamber 46 since the intake valve 48 blocks fluid flow through the intake port 34.

An exhaust valve 56 selectively places the exhaust manifold 54 in fluid communication with the combustion chamber 46. The exhaust valve 56 is actuated in a known manner by a camshaft (not shown), a pushrod (not shown), and a rocker arm (not shown) each of which are driven by the rotation of the crankshaft 50. When the exhaust valve 56 is placed in the open position (not shown) exhaust gases are advanced from the combustion chamber 46 to the exhaust manifold 54 via a fluid path that includes the exhaust port 36 and the exhaust conduit 52. When the exhaust valve 56 is placed in the closed position (shown in FIGS. 1 and 2) exhaust gases are prevented from advancing from the combustion chamber 46 to the exhaust manifold 54 since the exhaust valve 56 blocks fluid flow through the exhaust port 36.

The engine assembly 10 further includes a fuel reservoir 70. A fuel pump 72 draws low pressure fuel from the fuel reservoir 70 and advances high pressure fuel to a first fuel injector 62 via the fuel line 74. The first fuel injector 62 is positioned in the first injector opening 60 and is operable to inject a quantity of fuel into the combustion chamber 46 through the first injector opening 60. In particular, the first fuel injector 62 injects fuel into the combustion chamber 46 upon receipt of a first injector control signal on a signal line 100.

Referring now to FIG. 2, the second embodiment of the engine assembly 10 further includes a second Fuel injector 66 positioned proximate to a second fuel injector opening 68 defined in a side wall of the intake conduit 38. The second fuel injector 66 is operable to inject a quantity of fuel into the intake conduit 38 through the second injector opening 68. In particular, the engine assembly 10 further includes a second fuel reservoir 80. A second fuel pump 82 draws low pressure fuel from the second fuel reservoir 80 and advances high pressure fuel to the second fuel injector 66 via the fuel line 84. The pressurized fuel received from the fuel line 84 is injected into the intake conduit 38 by the second fuel injector 66 upon receipt of a second injector control signal on a signal line 98. The fuel injected into the intake conduit 38 is subsequently advanced to the combustion chamber 46 when the intake valve 48 is positioned in the open position.

It should be appreciated that the use of the second fuel injector 66 in the second embodiment allows a first type of fuel to be placed in the first reservoir 70 and a second type of fuel to be placed in the second reservoir 80, thus, allowing the first type of fuel to be advanced to the combustion chamber 46 with the first fuel injector 62 and the second type of fuel to be advanced to the combustion chamber 46 with the second fuel injector 66. However, it should be further appreciated that if it is desirable to advance a single fuel to the combustion chamber 46, the second fuel reservoir 80, the second fuel pump 82, and the fuel line 84 can be eliminated and the fuel line 74 can advance the first type of fuel to both the first fuel injector 62 and the second fuel injector 66.

Furthermore, both the first type of fuel an the second type of fuel can be any one of the following group of fuels: diesel fuel, crude oil, lubricating oil, or an emulsion of water and diesel fuel.

Referring again to FIGS. 1 and 2, the engine assembly 10 further includes a crank angle sensor 86 and a pressure sensor 88. The crank angle sensor 86 measures the instantaneous position of the crankshaft 50 and generates a crank angle signal in response thereto. The pressure sensor 88 is mounted on the engine head 32 and is in fluid communication with the combustion chamber 46. The pressure sensor 88 measures the instantaneous pressure in the combustion chamber 46 and generates a pressure signal in response thereto.

The engine assembly 10 further includes an engine control unit 90. The engine control unit 90 is operative to receive crank angle signals from a crank angle sensor 86 via the signal line 92 and pressure signals from the pressure sensor 88 via the signal line 94. The engine control unit 90 then generates the first injector control signal which is sent to the first fuel injector 62 via the signal line 100 that controls the quantity and timing of fuel injected by the first fuel injector 62. For the second embodiment of the engine assembly 10 (shown in FIG. 2), the engine control unit 90 also generates the second fuel injector control signal which is sent to the second fuel injector 66 via a signal line 98 that controls the quantity and timing of fuel injected by the second fuel injector 66.

The engine control unit 90 is further operable to control the gaseous fuel supply valve 41. Fuel control signals are sent to the gaseous fuel supply valve 41 via the signal line 96 causing the gaseous fuel supply valve 41 to control the air-fuel ratio of the air and gaseous fuel mixture advanced to the combustion chamber 46, as described above.

Industrial Applicability

In operation, the cylinder assembly 26 operates in a four stroke cycle. The first stroke is an intake stroke, during which the exhaust valve 56 is positioned in the closed position and the intake valve 48 is positioned in the open position. To create a homogeneous mixture of gaseous fuel, air, and pilot fuel in the combustion chamber prior to combustion, a small amount of pilot fuel, or conditioning fuel, is advanced to combustion chamber during the intake stroke.

To advance the conditioning fuel to the combustion chamber 46 with the first embodiment of the present invention (shown in FIG. 1), the engine control unit 90 sends the first injector control signal to the first fuel injector 62 via the signal line 100 which causes the first fuel injector 62 to inject the conditioning fuel into the combustion chamber 46 at the beginning of the intake stroke.

To advance the conditioning fuel to the combustion chamber 46 with the second embodiment of the present invention (shown in FIG. 2), the engine control unit 90 sends the second fuel injector control signal to the second fuel injector 66 via the signal line 98 which causes the second fuel injector 66 to inject the conditioning fuel into intake conduit 38 during the intake stroke. The conditioning fuel is thereby advanced to the combustion chamber 46 when the intake valve 48 is positioned in the open position.

During the intake stroke, the piston 40 is advanced in the general direction of arrow 44 thereby creating a low pressure in the combustion chamber 46. This low pressure draws gaseous fuel, air, and conditioning fuel downwardly so as to form a homogeneous mixture in the combustion chamber 46. It should be appreciated that the conditioning fuel conditions, or changes the ignition characteristics of, the mixture of air and gaseous fuel. In particular, the addition of conditioning fuel (i) lowers the pressure and temperature required to ignite the mixture of air and gaseous fuel and (ii) distributes pilot fuel substantially homogeneously throughout the mixture of air and gaseous fuel.

Figure 3A:
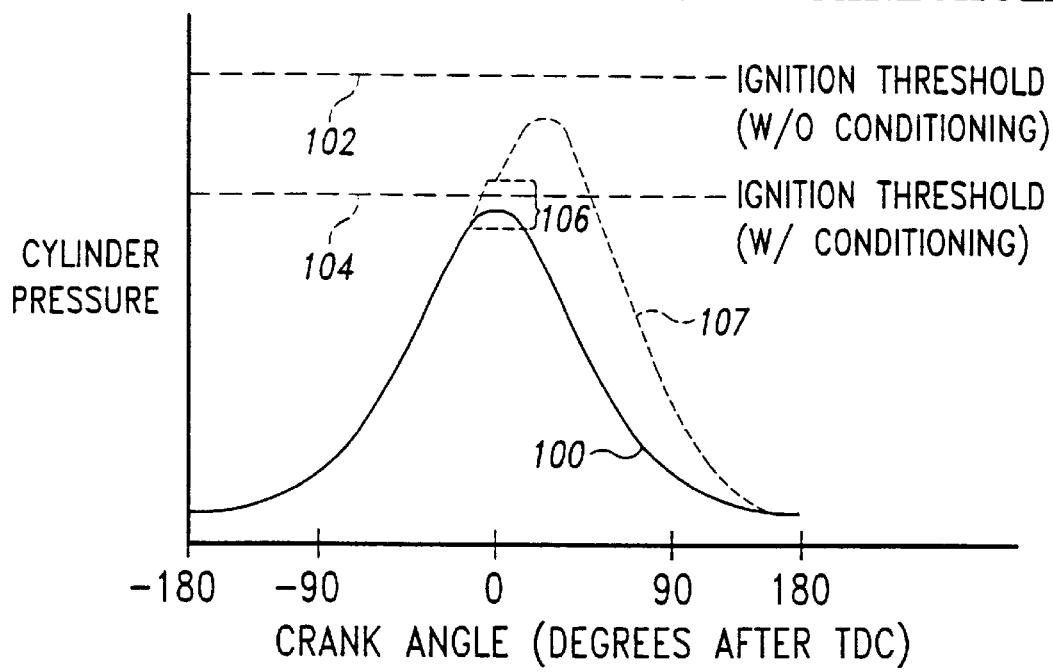
FIG. 3A is a graph which illustrates the pressure rise in the combustion chamber during the compression stroke of the engine assembly of FIG. 1.

Advancing to a compression stroke, the intake valve 48 and the exhaust valve 56 are both positioned in their respective closed positions. As the piston 40 moves upward in the general direction of arrow 42, it compresses the gaseous fuel, air, and conditioning fuel the combustion chamber 46. Referring now to FIG. 3A, a line 100 represents the pressure rise in the combustion chamber 46 as the gaseous fuel, air, and conditioning fuel are compressed by the piston 40 advancing from the beginning of the compression stroke, or 180 degrees before top dead center (TDC), toward the end of the compression stroke, or 0 degrees before TDC. A line 102 represents the combustion chamber pressure required to ignite a mixture of gaseous fuel and air which does not contain the conditioning fuel whereas a line 104 represents the combustion chamber pressure required to ignite the mixture of gaseous fuel, air, and conditioning fuel. The pressure required to ignite the mixture containing the conditioning fuel is significantly less because the conditioning fuel ignites more readily than the gaseous fuel.

Near the end of the compression stroke, the first fuel injector 62 injects a pilot fuel into the combustion chamber 46 so as to ignite the mixture of gaseous fuel, air, and conditioning fuel. A line 106 represents the additional pressure generated in the combustion chamber 46 due to the combustion of the pilot fuel. The combustion of pilot fuel increases the pressure in the combustion chamber 46 beyond the ignition threshold indicated by line 104. A line 107 represents the total pressure generated in combustion chamber 46 due to the combustion of the conditioning fuel and gaseous fuel ignited by the pilot fuel. It should be appreciated that the increased pressure in the combustion chamber 46 is accompanied by a corresponding increase in temperature which ignites the mixture in the combustion chamber 46.

The ignition threshold varies with changes in engine operating conditions such as engine load, inlet temperature, inlet pressure, and engine speed. The engine control unit 90 is operable to monitor the pressure signals from the pressure sensor 88 and adjust the advancement of the conditioning fuel and the injection of pilot fuel for subsequent cycles of the cylinder assembly 26 accordingly.

Figure 3B:
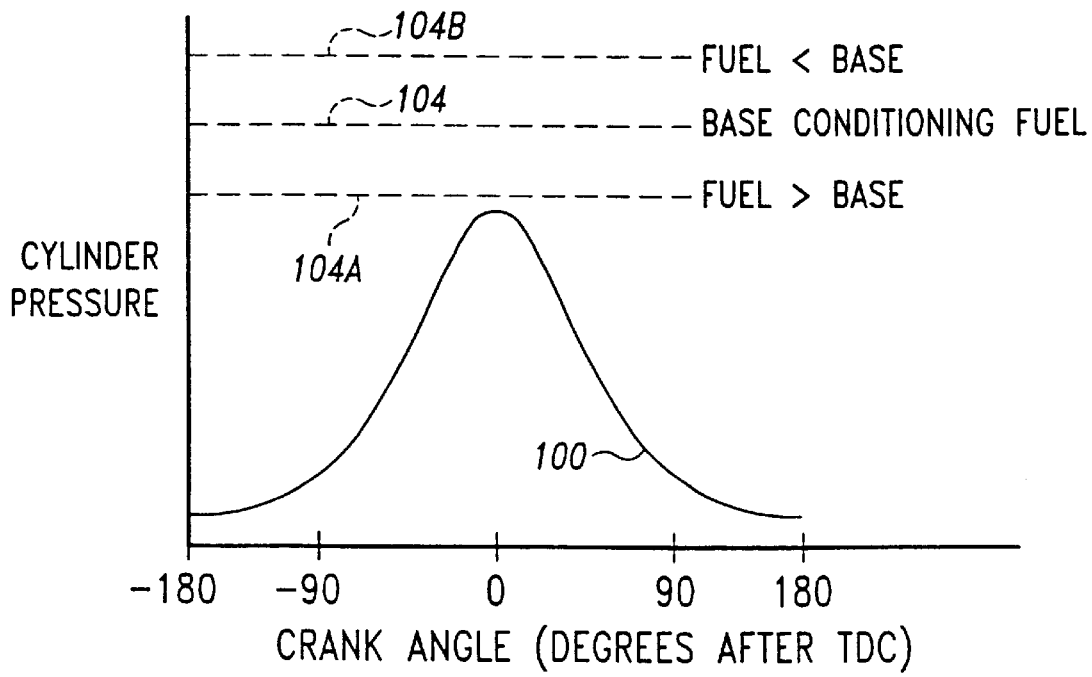
FIG. 3B is a graph similar to FIG. 3A which illustrates the variation in ignition threshold pressure due to advancing different amounts of conditioning fuel into the combustion chamber during an intake stroke.

Referring now to FIG. 3B, the amount of conditioning fuel can be adjusted to increase or decrease the ignition threshold in the combustion chamber during a compression stroke prior to injecting the pilot fuel. To lower the ignition threshold of the mixture of the gaseous fuel, air, and conditioning fuel, a greater amount of conditioning fuel is advanced into the combustion chamber 46 during the intake stroke. Note, that this lower ignition threshold is indicated by a line 104A. To raise the ignition threshold of the mixture of the gaseous fuel, air, and conditioning fuel, a lesser amount of conditioning fuel is advanced into the combustion chamber during the intake stroke. Note, that this raised ignition threshold is indicated by a line 104B. It should be appreciated that advancing too much conditioning fuel into the combustion chamber 46 is undesirable as the mixture of gaseous fuel, air, and conditioning fuel could prematurely ignite prior to the injection of the pilot fuel. On the other hand, if too little conditioning fuel is advanced into the combustion chamber 46, a greater amount of pilot fuel must be injected to increase the combustion chamber pressure beyond the ignition threshold and ignite the mixture of gaseous fuel, air, and conditioning fuel. However, increasing the amount of pilot fuel injected increases the production of $NO_x$ during the combustion process.

Figure 3C:
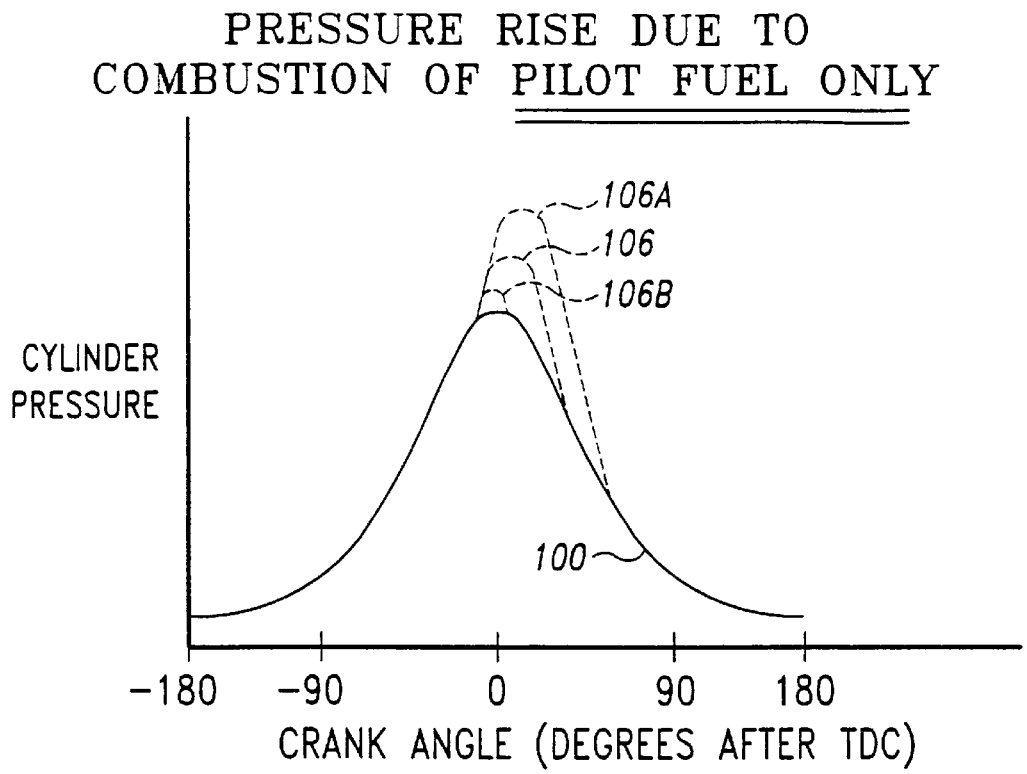
FIG. 3C is a graph similar to FIG. 3A which illustrates the pressure rise due to combusting different amounts of pilot fuel in the combustion chamber during a compression stroke.

Referring now to FIG. 3C, the amount of injected pilot fuel can be adjusted to increase or decrease the pressure in the combustion chamber 46 caused by combustion of the pilot fuel. To increase the pressure rise caused by combustion of the pilot fuel, a greater amount of pilot fuel is injected into the combustion chamber 46 to produce a pressure rise illustrated by line 106A. To decrease the pressure caused by combustion of the pilot fuel, a lesser amount of pilot fuel is injected into the combustion chamber to produce a pressure rise illustrated by line 106B. It should be appreciated that injecting too much pilot fuel into the combustion chamber 46 creates rich mixtures in the combustion chamber 46 which increase the production of $NO_x$. On the other hand, if too little pilot fuel is injected into the combustion chamber 46, then the mixture of gaseous fuel, air, and conditioning fuel may not ignite, and the engine 10 will cease to operate.

Figure 3D:
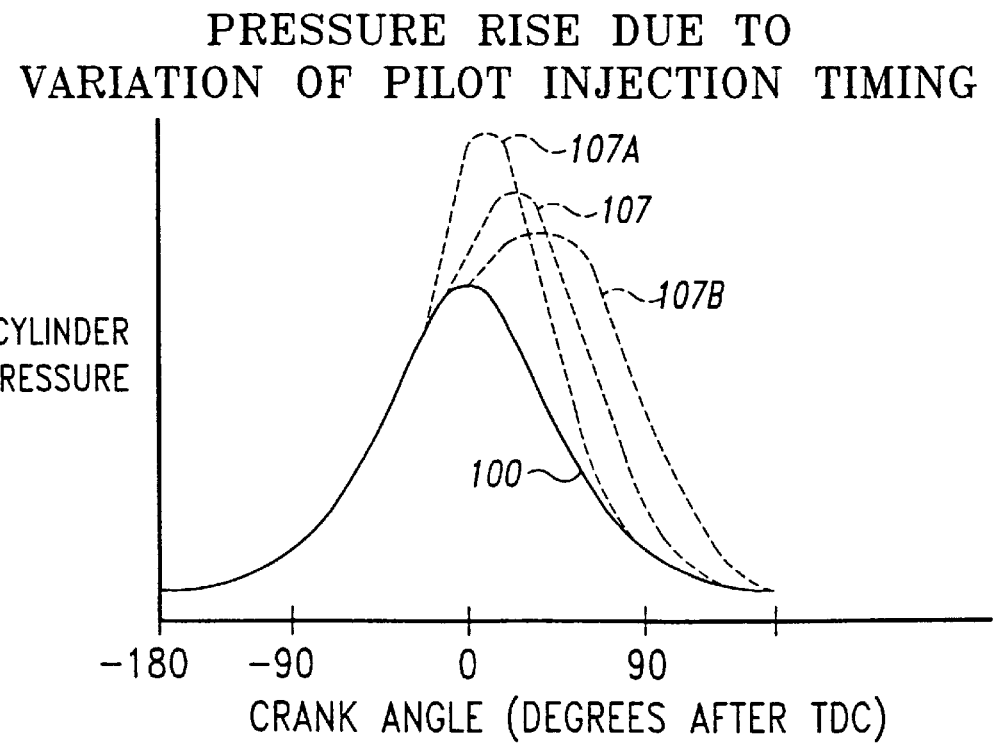
FIG. 3D is a graph similar to FIG. 3A which illustrates the pressure rise due to injecting the pilot fuel into the combustion chamber at various times during the compression stroke.

Referring now to FIG. 3D, the timing of the pilot injection can be adjusted to ignite the mixture of gaseous fuel, air, and conditioning fuel at various times during the compression stroke. To ignite the mixture at an earlier point of the compression stroke, the pilot fuel is injected into the combustion chamber 46 earlier in the compression stroke to produce a total pressure rise indicated by line 107A. To ignite the mixture at a later point of the compression stroke, the pilot fuel is injected into the combustion chamber 46 later in the compression stroke to produce a total pressure rise indicated by line 107B. It should be appreciated that injecting the pilot fuel into the combustion chamber 46 earlier may be desirable when the engine is running at higher speeds. At higher speeds, a compression stroke is accomplished in a shorter period of time. To compensate for a time delay between injection of the pilot fuel and ignition of the pilot fuel, the pilot fuel must be injected earlier at higher speeds to ignite the mixture at the proper time during the compression stroke. Alternately, injecting the pilot fuel into the combustion chamber 46 later may be desirable when the engine is running at lower speeds.

It should be appreciated that the conditioning fuel and the pilot fuel are a single fuel in the first embodiment of the present invention shown in FIG. 1 as the first fuel injector 62 is used to inject both the conditioning fuel and the pilot fuel. However, the second embodiment allows different types of fuel to be used as conditioning fuel and pilot fuel. In particular, the conditioning fuel is advanced to the combustion chamber 46 by the second fuel injector 66 whereas the pilot fuel is advanced by the first fuel injector 62. Moreover, the second embodiment can be operated to use a single type of fuel as both the conditioning fuel and the pilot fuel.

It should further be appreciated that by creating a homogeneous mixture of gaseous fuel, air, and conditioning fuel throughout the combustion chamber prior to injecting the pilot fuel into the combustion chamber allows the engine to operate with individual injections of pilot fuel which are smaller in volume. This is true since the conditioning fuel is homogeneously distributed throughout the combustion chamber 46 and thereby acts to lower the ignition threshold as shown in FIG. 3A.

It should additionally be appreciated that by creating a homogeneous mixture of gaseous fuel, air, and conditioning fuel throughout the combustion chamber prior to injecting the pilot fuel into the combustion chamber effectively provides a relatively large number of ignition sources for the gaseous fuel. This large number of ignition sources causes rapid combustion of the very lean homogenous mixture throughout the combustion chamber thereby resulting in the production of a relatively small quantity of $NO_x$.

The combustion of the gaseous fuel, air, conditioning fuel, and pilot fuel advances the cylinder assembly 26 to a power stroke in which the intake valve 48 and the exhaust valve 56 are both positioned in their respective closed positions. As the gaseous fuel, air, conditioning fuel, and pilot fuel are combusted, exhaust gases are formed. The formation of the exhaust gases generates pressure which acts upon the piston 40 to drive the piston 40 in the general direction of arrow 44. The movement of the piston 40 in the general direction of arrow 44 causes the crankshaft 50 to rotate in the general direction of arrow 51.

Thereafter, the piston assembly 26 is advanced to an exhaust stroke during which the exhaust valve 56 is positioned in the open position and the intake valve 48 is positioned in the closed position. Since the pressure generated by the formation of exhaust gases in the combustion chamber 46 is greater than the pressure in the exhaust manifold 54, the exhaust gases advance from the combustion chamber 46, through the exhaust port 36, through the exhaust conduit 52, and into the exhaust manifold 54. From the exhaust manifold 54, the exhaust gases are advanced to a turbocharger (not shown) prior to being exhausted to the atmosphere.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A method of operating an engine assembly having a cylinder assembly which defines a combustion chamber, comprising the steps of:

performing an intake stroke of the cylinder assembly;

advancing a conditioning fuel into the combustion chamber during the intake stroke performing step;

advancing a gaseous fuel into the combustion chamber during the intake stroke performing step;

performing a compression stroke of the cylinder assembly after the intake stroke performing step;

advancing a pilot fuel into the combustion chamber during the compression stroke performing step; and combusting the pilot fuel in the combustion chamber during the compression stroke performing step so as to ignite the conditioning fuel and the gaseous fuel, whereby the gaseous fuel and the conditioning fuel are mixed in the combustion chamber prior to the pilot fuel advancing step so as to facilitate ignition of the gaseous fuel in the combustion chamber.

2. The method of claim 1, wherein:

the engine assembly further includes a fuel injector, the conditioning fuel advancing step includes the step of operating the fuel injector to advance the conditioning fuel into the combustion chamber, and the pilot fuel advancing step includes the step of operating the fuel injector to advance the pilot fuel into the combustion chamber.

3. The method of claim 2, wherein:

the cylinder assembly includes an engine head, the engine head includes an injector opening defined therein, the fuel injector is positioned to inject pilot fuel through the injector opening, and the pilot fuel advancing step includes the step of injecting pilot fuel into the combustion chamber through the injector opening.

4. The method of claim 2, wherein:
the conditioning fuel is diesel fuel, and
the pilot fuel is diesel fuel.

5. The method of claim 1, wherein:
the engine assembly further includes a pressure sensor positioned to measure pressure in the combustion chamber, and
the conditioning fuel advancing step further includes the steps of (i) measuring the pressure in the combustion chamber during the compression stroke so as to obtain a number of measured pressure values, and (ii) adjusting the amount of conditioning fuel advanced to the combustion chamber during a subsequent intake stroke based on the measured pressure values.

6. The method of claim 1, wherein:
the engine assembly further includes a pressure sensor positioned to measure pressure in the combustion chamber, and
the pilot fuel advancing step further includes the steps of (i) measuring the pressure in the combustion chamber during the compression stroke so as to obtain a number of measured pressure values, and (ii) adjusting the amount of pilot fuel advanced into the combustion chamber during a subsequent compression stroke based on the measured pressure values.

7. The method of claim 1, wherein:
the engine assembly further includes a pressure sensor positioned to measure pressure in the combustion chamber, and
the pilot fuel advancing step further includes the steps of (i) measuring the pre sure in the combustion chamber during the compression stroke so as to obtain a number of measured pressure values, and (ii) adjusting when the pilot fuel is advanced into the combustion chamber during the compression stroke based on the measured pressure values.

8. The method of claim 1, wherein:
the engine assembly further includes a first fuel injector and a second fuel injector,
the pilot fuel advancing step includes the step of operating the first fuel injector to advance the pilot fuel into the combustion chamber, and
the conditioning fuel advancing step includes the step of operating the second injector to advance the conditioning fuel into the combustion chamber.

9. The method of claim 8, wherein:
the cylinder assembly includes an engine head,
the engine head includes a first injector opening defined therein,
the first fuel injector is positioned to inject pilot fuel through the first injector opening, and
the pilot fuel advancing step further includes the step of injecting pilot fuel into the combustion chamber through the first injector opening.

10. The method of claim 8, wherein:
the engine assembly further includes an intake conduit which is in fluid communication with the combustion chamber,
the intake conduit includes a second injector opening defined in a side wall thereof,
the second fuel injector is positioned to inject conditioning fuel through the second injector opening, and
the conditioning fuel advancing step includes the step of injecting conditioning fuel into the intake conduit through the second injector opening.

11. The method of claim 10, wherein:
the conditioning fuel is selected from the group consisting essentially of (i) a lubricating oil, (ii) a crude oil, and (iii) an emulsion of $H_2O$ and diesel fuel, and
the pilot fuel is diesel fuel.

12. A method of operating an engine assembly having a cylinder assembly which defines a combustion chamber, with the cylinder assembly being operable to perform an intake stroke and a compression stroke, comprising the steps of:
advancing a conditioning fuel into the combustion chamber with a fuel injector during the intake stroke;
advancing a gaseous fuel into the combustion chamber during the intake stroke;
advancing a pilot fuel into the combustion chamber with the fuel injector during the compression stroke; and
combusting the pilot fuel in the combustion chamber during the compression stroke so as to ignite the conditioning fuel and the gaseous fuel.

13. The method of claim 12, wherein:
the cylinder assembly includes an engine head,
the engine head includes an injector opening defined therein,
the fuel injector is positioned to inject pilot fuel through the injector opening, and
the pilot fuel advancing step includes the step of injecting pilot fuel into the combustion chamber through the injector opening.

14. The method of claim 12, wherein:
the conditioning fuel is diesel fuel, and
the pilot fuel is diesel fuel.

15. The method of claim 12, wherein:
the engine assembly further includes a pressure sensor positioned to measure pressure in the combustion chamber,
the pilot fuel advancing step further includes the step of measuring the pressure in the combustion chamber during the compression stroke so as to obtain a number of measured pressure values,
the conditioning fuel advancing step further includes the step of adjusting the amount of conditioning fuel advanced to the combustion chamber during a subsequent intake stroke based on the measured pressure values, and
the pilot fuel advancing step further includes the steps of (i) adjusting the amount of pilot fuel advanced to the combustion chamber during a subsequent compression stroke based on the measured pressure values and (ii) adjusting when the pilot fuel is advanced into the combustion chamber during the subsequent compression stroke based on the measured pressure values.

16. A method of operating an engine assembly having a cylinder assembly which defines a combustion chamber, with the cylinder assembly being operable to perform an intake stroke and a compression stroke, comprising the steps of:
advancing a conditioning fuel into the combustion chamber with a conditioning fuel injector during the intake stroke;
advancing a gaseous fuel into the combustion chamber during the intake stroke;

advancing a pilot fuel into the combustion chamber with a pilot fuel injector during the compression stroke; and combusting the pilot fuel in the combustion chamber during the compression stroke so as to ignite the conditioning fuel and the gaseous fuel.

17. The method of claim 16, wherein:

the engine assembly further includes an intake conduit which is in fluid communication with the combustion chamber, the intake conduit includes a conditioning injector opening defined in a side wall thereof, the conditioning fuel injector is positioned to inject conditioning fuel through the second injector opening, and the conditioning fuel advancing step includes the step of injecting conditioning fuel into the intake conduit through the conditioning injector opening.

18. The method of claim 17, wherein:

the cylinder assembly includes an engine head, the engine head includes a pilot injector opening defined therein, the pilot fuel injector is positioned to inject pilot fuel through the pilot injector opening, and the pilot fuel advancing step includes the step of injecting pilot fuel into the combustion chamber through the pilot injector opening.

19. The method of claim 18, wherein:

the conditioning fuel is selected from the group consisting essentially of (i) a lubricating oil, (ii) a crude oil, and (iii) an emulsion of $H_2O$ and diesel fuel, and the pilot fuel is diesel fuel.

20. The method of claim 16, wherein:

the engine assembly further includes a pressure sensor positioned to measure pressure in the combustion chamber, the pilot fuel advancing step further includes the step of measuring the pressure in the combustion chamber during the compression stroke so as to obtain a number of measured pressure values, the conditioning fuel advancing step further includes the step of adjusting the amount of conditioning fuel advanced to the combustion chamber during the subsequent intake stroke based on the measured pressure values, and the pilot fuel advancing step further includes the steps of (i) adjusting the amount of pilot fuel advanced to the combustion chamber during a subsequent compression stroke based on the measured pressure values and (ii) adjusting when the pilot fuel is advanced to the combustion chamber during a subsequent compression stroke based on the measured pressure values.

* * * * *